Nov. 24, 1964

H. K. CYMARA 3,158,408

SILO DISTRIBUTOR

Filed Nov. 7, 1963

INVENTOR.
HERMANN·K·CYMARA

BY

*F.P. Kupier*

ATTORNEY

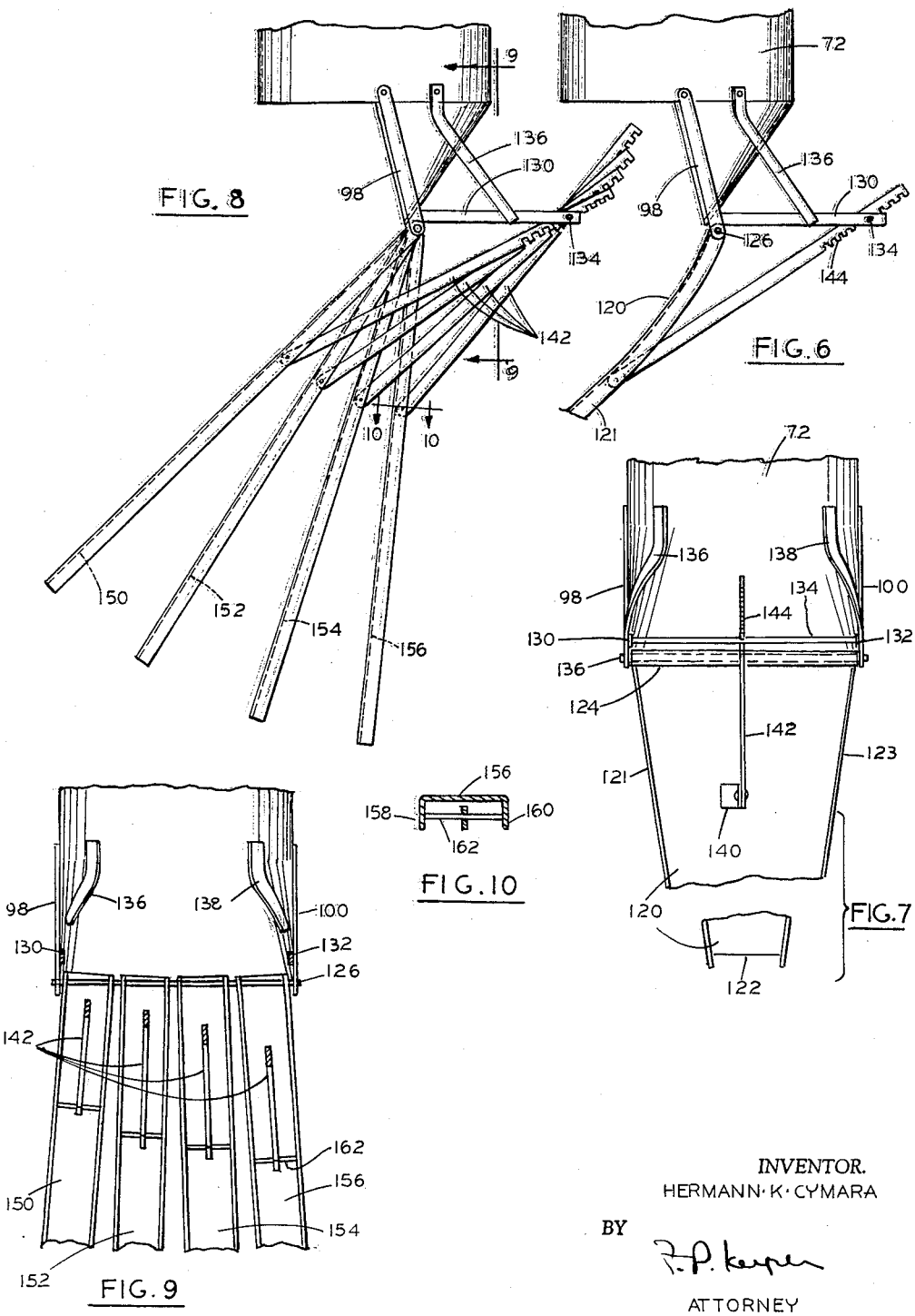

Nov. 24, 1964     H. K. CYMARA     3,158,408
SILO DISTRIBUTOR

Filed Nov. 7, 1963     3 Sheets-Sheet 3

INVENTOR.
HERMANN·K·CYMARA
BY
ATTORNEY

United States Patent Office 3,158,408
Patented Nov. 24, 1964

3,158,408
SILO DISTRIBUTOR
Hermann K. Cymara, R.D. 2, Newfield, N.Y.
Filed Nov. 7, 1963, Ser. No. 322,121
5 Claims. (Cl. 302—60)

This invention relates to a silage distributor for filling silos, and more particularly to a power driven silo distributor having provision for establishing uniform distribution.

Storage of silage in a silo is effected by discharge of silage from a delivery tube at the upper end of the silo from a position beneath the roof at the approximate center. While the much greater height of the silo as compared to its diameter is conducive to a somewhat uniform build up of silage discharged in this manner, particularly at the lower levels, such distribution may rapidly tend to become uneven as the depth increases, by piling up in the center or along one side or around the periphery resulting in voids.

The present invention is directed to apparatus adapted to be selectively adjusted to provide a wide range of build up patterns, so that any uneveness in the build up of silage can be corrected by altering the setting of the distributor element or elements, at will, from time to time. In addition an even build up may be provided for by varying the setting of the distributor means. The invention is further directed to a power drive for slowly rotating the distributor on a vertical axis and a thrust bearing structure for the rotary distributor capable of supporting the distributor in any of a wide range of off center settings. Additionally power drive is provided having a minimum of exposure of the driving parts, with the driving parts being so constructed as to not be adversely effected by any accumulation of foreign matter thereon. The invention further has to do with the simplification of structure such that economical manufacture can be had.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 6 is a fragmentary side elevational view of a modified form of distributor chute;

FIGURE 7 is a rear view of the distributor chute of FIGURE 6;

FIGURE 8 is a side view of a further modified form of distributor chute;

FIGURE 9 is a fragmentary rear view of the distributor chute of FIGURE 8;

FIGURE 10 is a sectional view taken on the line 10—10 of FIGURE 8;

Figure 1:
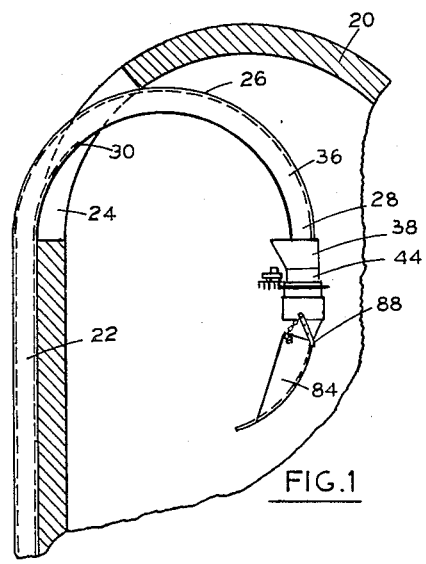
FIGURE 1 is a side elevational view of the distributor disposed within the upper end of a silo with the silo shown in section.

Referring to the drawings, there is shown in FIGURE 1, the upper end or dome roof 20 of a silo, having a supply duct 22 through which is blown ensilage, as by forced draft from the ground below. The silo has a doorway 24, through which the gooseneck end 26 of the duct extends, the downwardly extending end 28 being disposed at about the center of the silo, it being understood that silos, in general, are circular. Such duct transforms from a closed duct to an open downwardly facing channel at about the center of the gooseneck, as is indicated at 30. The channel section end 28, comprises the curved bottom wall 32 of the channel, and spaced side flanges 34 and 36.

The side flanges 34 and 36 are secured to the opposite sides of a funnel-like sleeve 38, as by bolts 40. The upper end 42 of the sleeve 38 is of rectangular configuration. The sleeve gradually transforms to a cylindrical section as at 44. The lower end of the cylindrical section 44 has an outwardly extending circular bearing flange 46, and is surrounded by a circular depending sleeve 48 having an outwardly extending flange 50 at its upper end. Secured to the flange 50, in any suitable fashion, is an annular bearing plate 52 having peripheral teeth 54, along its outer edge, and top and bottom bearing surfaces adjacent its inner edge confined between two annular rows of anti-friction balls 56 and 58, the lower row of balls rolling on the flange 46, and the upper row being confined by a Z section annular collar raceway 60 affixed to the sleeve 44.

The peripheral teeth 54 of the plate 52 mesh with depending pins 61 of a pin wheel 62 mounted on a shaft 64 driven by a speed reducer 66 and small motor 68, the speed reducer and motor being mounted on a bracket 70 affixed to the side of the sleeve 44. The speed at which the sleeve 48 is rotated, being in the order of about one revolution per minute, it will be seen that the motor may be of extremely small fractional horsepower, operating through a high reduction ratio speed reducer. It will be seen that the depending pins of the pin wheel are protected from foreign matter and that the teeth 54 have a minimum exposure.

Telescopically secured about the lower end of sleeve 48, is a discharge collar and spout 70, the upper or collar portion of which is cylindrical as at 72. To the lower open end is applied, on one side thereof a spout portion 74, the side edges 76 and 78 of which depend substantially parallel and terminate in a transverse discharge lip 78. The wall 80 of the spout gradually varies in configuration from the straight lip to a semi-circular configuration where it joins the cylindrical portion 72, as at 82.

Figure 2:
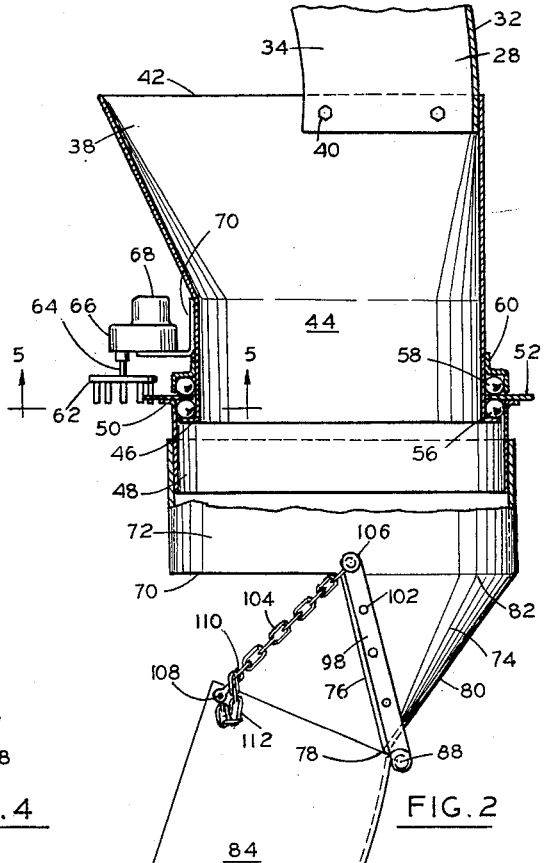
FIGURE 2 is a side view of the distributor, with parts shown in section.
Figures 3, 4:
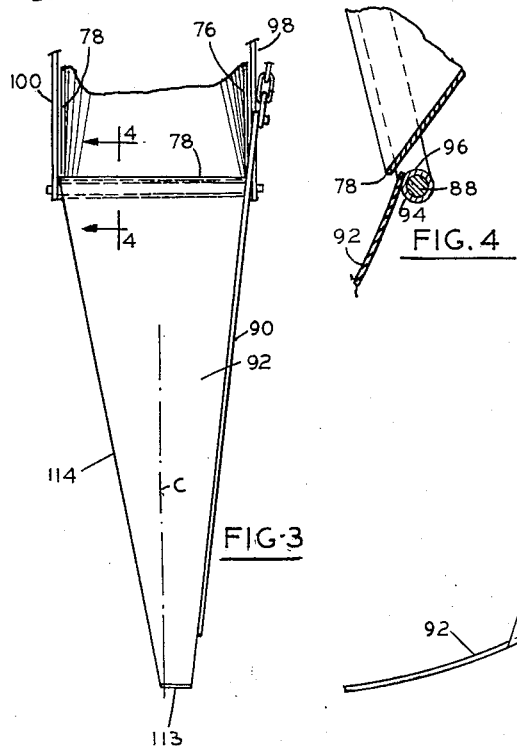
FIGURE 3 is a front view of the distributor chute portion of the silo.
FIGURE 4 is an enlarged fragmentary sectional view taken on the line 4—4 of FIGURE 3.
Figure 5:
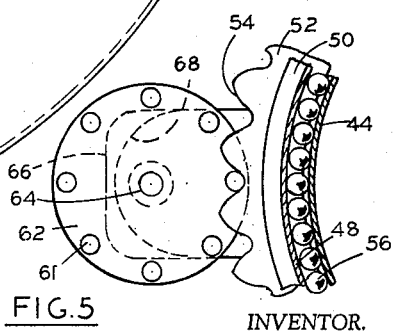
FIGURE 5 is a fragmentary sectional view looking upwardly of the drive mechanism, taken on the line 5—5 of FIGURE 2.

As shown in FIGURES 2 and 3, a distributor chute 84 having an arcuate gradually narrowing surface 92 is pivotally attached behind the lower end or lip of the spout as at 88. The chute has a side flange 90 of decreasing width extending from the upper end to a point about two-thirds of the length of the chute. The curved narrowing plate 92, which forms the bottom of the distributor chute has affixed to the rear of its upper end a bearing tube 94, which is pivotally supported on a hinge pin 96 extending between the ends of arms 98 and 100 secured along the sides of the spout and the lower end of the sleeve 72, as by rivets 102, and such arms extend downwardly and terminate behind the lip 78 of the spout 74.

A link chain 104 is provided, having one end affixed as at 106 to the upper end of the arm 98, and its lower end affixed to a pin 108 in the flange 90 of the distributor 84. A hook 110 affixed to the flange 90 by the pin 108 is provided so that the active portion of the chain may be shortened as desired to vary the angle of the distributor chute, the excess chain being doubled up as at 112. It will be observed that the curved plate 92 of the distributor chute narrows from a width of 9 or 10 inches at its upper end, to a width of about two inches at its lower end 113, and that the inclined unflanged side edge 114 inclines rather uniformly from the upper end thereof to the center line C at the lower end. By varying the angle of the distributor chute through adjustment of the effective length of the chain 104, a uniform distribution pattern can be arrived at such that the ensilage will build up in the silo level at a uniform rate, as the distributor rotates about the central axis of the silo.

In FIGURES 6 and 7, there is shown a modified form of distributor chute in the form of a curved blade tapered from the upper end to the lower end. Referring to FIGURES 6 and 7, the modified form of distributor will be seen as having both sides open. The distributor comprises a lengthwise curved plate 120, which is the full width of the lip 78 of the spout 74 at the upper end, which in practice may be about 9 or 10 inches wide. The width may gradually decrease to about 2 inches at its lower end as at 122. The chute may be about 30 inches long, and the curvature of the surface may embrace about 45 degrees. The side edges of the surface are provided with depending flanges 121 and 123 to stiffen the plate. The upper end of the distributor is provided with a tubular pivot member 124, and a pivot pin 126 extending therethrough and supported in the side arms 98 and 100 extending downwardly along the sides of the spout. In order to vary the angle of the distributor chute with reference to the spout, there is provided a substantially horizontal U frame extending rearwardly from the arms 98 and 100, the U frame comprising side members 130 and 132, affixed to the arms 98 and 100, and a cross member 134 disposed a substantial distance behind the lip 78, and pivot pin 126. The side members 130 and 132 are braced by struts 136 and 138 extending upward to the collar 72 above the chute 74. A bracket is affixed to the underside of the distributor as at 140, and a link 142 is pivotally attached to the bracket and extends upwardly, and is provided with a plurality of notches 144, adapted to engage the cross member 134. By lifting the link, and interlocking any one of the notches 144 with the cross member 134, the angle of the distributor chute can be varied to suit the nature of the ensilage being distributed to provide a uniform distribution thereof as it discharges from the end and sides of the distributor chute in filling the silo.

In FIGURES 8, 9 and 10 a further form of distributor chute is shown wherein the chute comprises a plurality of blade-like members disposed side by side, in a somewhat splayed relation to each other for effecting a distribution pattern whereby a uniform build up of ensilage will result. As shown, the spout 74 is provided with the same side arms 98 and 100, and pivot pin 126, as in FIGURES 6 and 7. Also a U frame having side members 130 and 132, braced as at 136 and 138, and a cross member 134 is provided. Pivoted on the pin 126, are a plurality of distributing fingers, which are in the form of channels 150, 152, 154 and 156, the side flanges 158 and 160 of which stiffen the fingers. Such fingers may be about two inches wide and up to 30 inches in length. At the upper end of each finger, the side flanges thereof are apertured and threaded on the pin 126, for pivotal movement thereon. The apertures in the two flanges of each finger are disposed on an axis angularly disposed from the transverse axis of the finger so that the free ends of the fingers diverge away from one another, in a splayed fashion. Each of the fingers is provided with a cross pin 162 extending between its flanges disposed at a distance from the pivot pin 126. Pivoted on each cross pin of each finger is a notched adjusting link, 142 adapted to extend over the cross member 134. By adjusting each of the links as desired, by engaging one notch 144 or another, in locking relation to the cross member 134, a wide variation in the distribution pattern of the combined distributing effect of the fingers can be had, such that silage may be built up evenly in the silo, as the silo is being filled.

Figures 11, 12, 13:
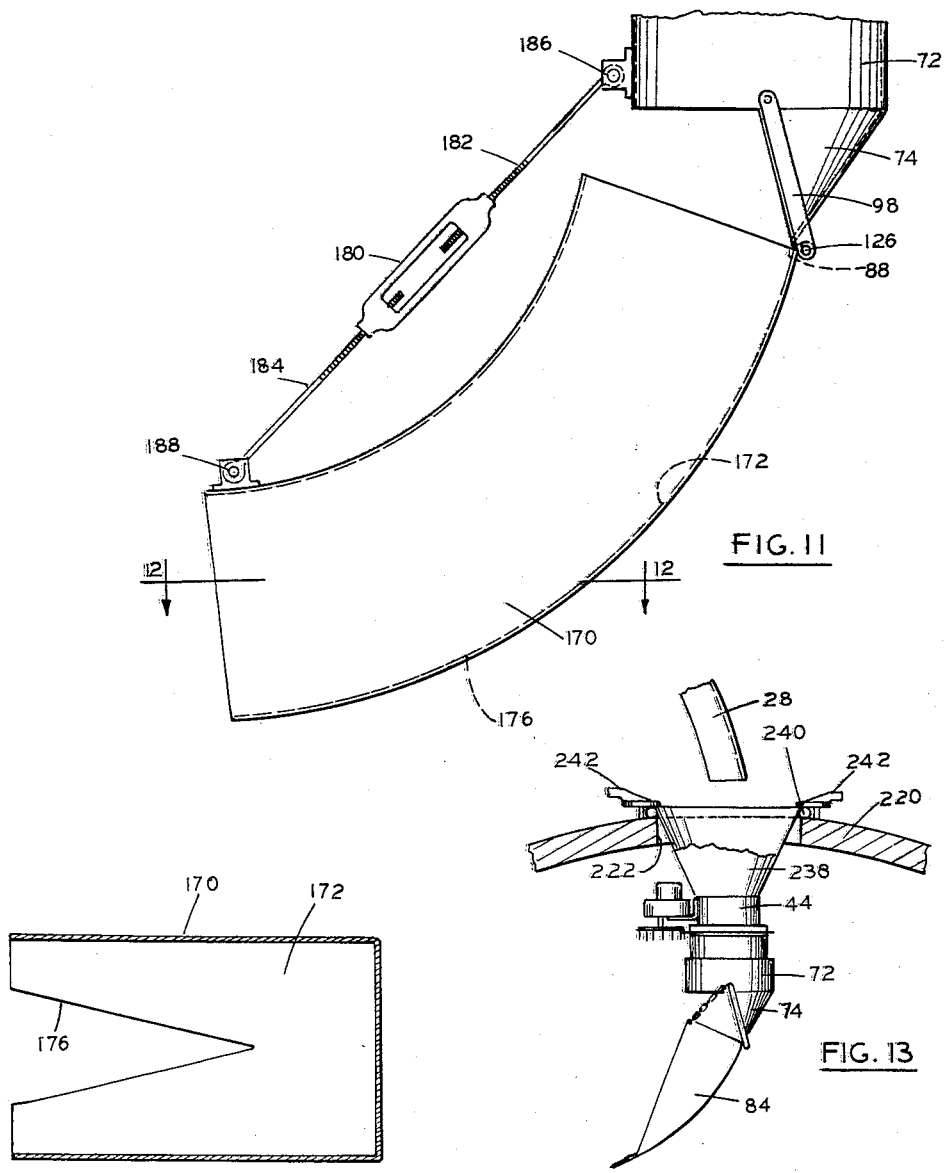
FIGURE 11 is a side elevational view of a further modified form of distributor chute.
FIGURE 12 is a sectional view of the distributor chute of FIGURE 11, taken on the line 12—12 of FIGURE 11
FIGURE 13 is a sectional view of a modified mounting of the distributor from the silo roof.

In FIGURES 11 and 12 a further modification of the distributor is shown, wherein the distributor is in the form of a substantially rectangular cross sectioned tube 170, having a bend of as much as 60° as indicated at 172. The tube may have a length up to 30 inches. Its upper end is as wide as the lip 88 of the spout, and is provided with a pivot tube, pivoted on the pin 126 extending between the arms such as 98 and 100 as in the previous modifications. The lower wall of the tube is provided with a wide V cut out portion 176, which provides for varying discharge conducive to even distribution. The angle at which the tubular distributor may be set can be adjusted through the turn buckle 180, the end links 182 and 184 of which are pivotally attached to brackets 186 and 188 mounted on the collar 72 and the tube end respectively.

Referring to FIGURE 13, in silos having a circular opening such as 222 in the center of the roof 220, which may have a diameter of about seventeen inches, the distributor may be provided with a conical funnel 238 leading and affixed to the sleeve 44. Such funnel, at its upper end is provided with an exterior tubular rim 240 adapted to rest upon the rim of the opening 222, in about the same manner as the circular cover used to close the opening 222, when the opening is not in use for filling. The rim rests upon the roof and supports the distributor therefrom below. The rim may be secured in place by use of the same rotary cam clamps 242, as are employed to hold the roof cover in place. The funnel is then supplied by the usual discharge duct 28 located just above the silo roof. It will be seen that the roof opening is sufficiently large to allow the entire distributor to be set in position or removed from the roof by merely lifting the assembly through the opening.

While modifications of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

This application is a continuation in part of my application Serial #227,858 filed October 2, 1962.

What is claimed is:

1. A silage distributor adapted to receive silage from a silo discharge spout comprising a hopper sleeve adapted to be supported in the upper end of a silo beneath a silo discharge spout, said sleeve having a lower cylindrical portion terminating in an annular outwardly projecting flange and lower ball bearing raceway, an annular Z section member affixed externally to said cylindrical portion in uniformly spaced relation from said flange, said Z member having an annular intermediate portion extending radially outward from said cylindrical portion and forming an upper ball bearing raceway, and its outer annular portion depending downwardly to form a ball retaining skirt, an annular bearing plate having its inner peripheral portion disposed midway between said flange and radially outwardly extending portion of said Z member, and upper and lower annular rows of bearing balls disposed on opposite sides of said plate and rolling on said upper and lower ball bearing raceways respectively, a cylindrical discharge sleeve having an upper outwardly extending flange affixed to the underside of said plate, and surrounding said lower raceway and acting to confine the lower row of bearing balls and enter said plate with respect to said cylindrical portion, said plate having gear teeth formed in its outer periphery, a motor and reduction gear mounted on the side of said hopper sleeve and having a depending drive shaft and depending pin wheel in meshing relation with said gear teeth, a distributor discharge spout affixed to one side of the lower end of said discharge sleeve having a lower transverse lip, distributor chute means supported from said spout and pivoted in respect to said distributor spout on a substantially horizontal axis adjacent said lip, and means for varying the angular relation of said chute means in reference to said distributor spout.

2. A silage distributor in accordance with claim 1, wherein the hopper sleeve is provided at its upper end with a conical funnel having an external marginal flange at its upper end adapted to seat upon the marginal edge of a circular aperture in the center of a silo roof.

3. A silage distributor in accordance with claim 1, wherein the chute means comprises a discharge chute having an arcuate discharge surface of narrowing width from its upper pivot end, and a side flange along one side of said surface only, and means for adjusting the angle of the chute extending from the side flange to the discharge sleeve.

4. A silage distributor in accordance with claim 1, wherein the discharge chute means comprises a plurality of independent elongate chute members disposed in splayed relation and pivoted adjacent the spout lip, and strut means extending from beneath each of said members to a bracket disposed behind the distributor spout and affixed to said discharge sleeve, to independently fix the angle of each of said chute members with reference to said distributor spout.

5. A silage distributor in accordance with claim 1, wherein the discharge chute means comprises a curved tubular member of rectangular cross section having its upper end disposed below and pivoted behind said distributor spout, and in which the lower wall of said tubular member adjacent its lower end has a wide V slot, and in which the means for varying the angular relation of the chute comprises an adjustable link pivotally connecting the lower ends of said tubular member with said discharge sleeve.

No references cited.